United States Patent [19]

Jensen

[11] 3,992,097

[45] Nov. 16, 1976

[54] MOUNTING DEVICE FOR PRINTING COPYING CAMERA

[75] Inventor: Gerald A. Jensen, Wayzata, Minn.

[73] Assignee: Pako Corporation, Minneapolis, Minn.

[22] Filed: May 16, 1975

[21] Appl. No.: 577,988

[52] U.S. Cl. .................................... 355/56; 355/55; 355/61

[51] Int. Cl.[2] ..................... G03B 27/36; G03B 27/38

[58] Field of Search ................... 355/55, 56, 57, 58, 355/59, 60, 61, 62, 63

[56] References Cited

UNITED STATES PATENTS

| | | | |
|---|---|---|---|
| 2,307,479 | 1/1943 | Annick | 355/61 X |
| 3,424,530 | 1/1969 | Leonhart | 355/61 |
| 2,508,649 | 5/1950 | Powers | 355/61 |
| 2,567,293 | 9/1951 | Maxwell | 355/55 |
| 3,604,795 | 9/1971 | Crandall | 355/56 |

*Primary Examiner*—L. T. Hix
*Assistant Examiner*—E. M. O'Connor
*Attorney, Agent, or Firm*—John W. Adams

[57] ABSTRACT

An adjustable camera mounting device including a print holding panel located at an operating station at one end of the device and an elongated camera-mounting guide track extending generally normal to said panel with a pair of camera-mounting slides carried on said track, one for mounting the main camera body and the other for mounting the lens of the camera, and having controllably rotatable drive shafts constructed and arranged so that the operating controls are positioned at the operating station and rotation of one shaft moves both slides together without varying the spacing therebetween and rotation of the other shaft moves only the camera focusing, lens-mounting slide to permit the camera position and focus to be quickly and easily adjusted for different sized prints to be copied and also including indexing counters located at the operating station and connected to said shafts to indicate the respective positions of the slides.

4 Claims, 3 Drawing Figures

MOUNTING DEVICE FOR PRINTING COPYING CAMERA

It is an object of the present invention to provide a mounting mechanism for a camera for copying photographic prints, such as Polaroid prints, which can be quickly and easily positioned and focused by the operator.

It is a more specific object to provide such a camera-mounting mechansim which includes a pair of separate enlongated positioning shafts having means for rotating the same and having the film containing portion of the camera connected with one of said shafts for positioning the film with respect to the print to be copied, and the other shaft being connected to the lens of the camera to focus the camera with respect to the print to be copied, whereby the camera and the lens may be independently moved by the operator to facilitate making the required adjustments for different sized prints.

These and other objects and advantages of this invention will be apparent from the following description made in connection with the accompanying drawing wherein like reference characters refer to similar parts throughout the several views, and in which.

Figure 1:
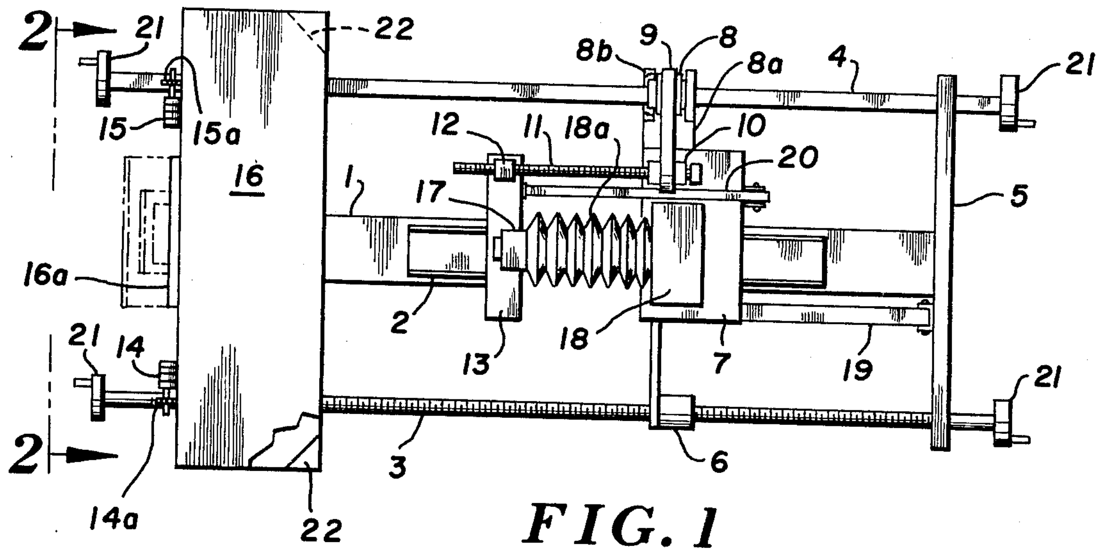
FIG. 1 is a top plan view of a camera mounting device embodying this invention and having the outer housing or casing removed.
Figure 2:
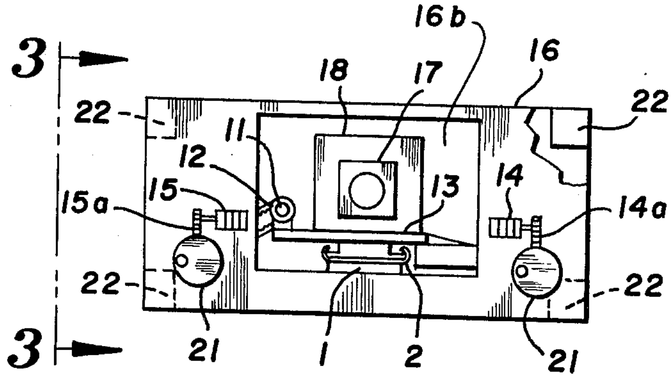
FIG. 2 is a front elevational view of the device.
Figure 3:
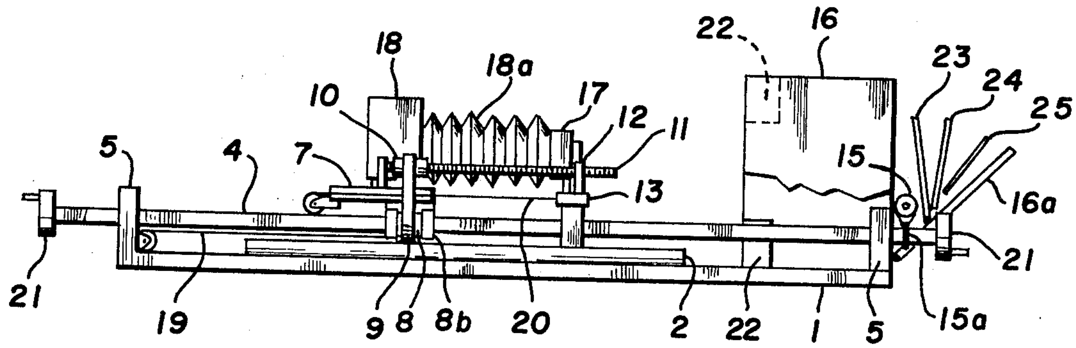
FIG. 3 is a side elevational view thereof showing one side of the device.

This is a mounting for a camera for copying photographic prints. It is comprised of a rigid supporting frame 1 which holds a central guide track 2 extending substantially the length of the frame 1 with an operating station at one end of said frame. A lamp housing 16 is mounted at the operating end of the frame 1, and has a hinged print holding panel **16*a* on the front side thereof with a light passage window 16*b* on the back side. Parallel to the central guide track 2 are two elongated shafts 3 and 4 with operating control cranks 21 fixed at the respective ends thereof. Said shafts extend substantially the full length of said frame 1 and are journaled for rotation in the ends of said frame 1. The shaft 3 is externally threaded, and the other shaft 4** is smooth and in the form shown is rectangular in cross section.

The externally threaded shaft 3 is, in the form shown, supported by two transverse supporting frame members 5 rigidly connected to the supporting frame 1. An internally threaded bushing 6 is mated with the externally threaded shaft 3 and is rigidly connected to a slide 7 on which the main body 18 of a camera is mounted. A slide 13 is also mounted on said track 2 and the slides 7 and 13 respectively carry a main camera body 18 and a lens 17 with a bellows **18*a* extending therebetween. When the externally threaded shaft 3 is rotated, bushing 6 is moved back and forth and this movement is transmitted to slide 7 and the main camera body 18, causing said slide and camera body to move back or forward along said guide track 2**.

The rectangular shaft 4 is rotatably mounted on said transverse supporting members 5 and is supported thereby. A sliding pulley 8 is slidably mounted on the shaft 4 for rotation therewith and is rotatably mounted on a suitable tying bracket **8*a* fixed to slide 7, which carries suitable bearings 8*b*. A timing belt 9 connects pulley 8 to a driven pulley 10 which is fixed to an externally threaded focusing shaft 11. Said shaft 11 is rotatably supported by a bearing fixed to the slide 7 and by an internally threaded bushing 12 fixed to a lens mounting slide 13 which carries a camera lens 17**.

The focusing shaft 11 thus ties the two slides 7 and 13 together and rotation of the threaded shaft 3 adjusts the distance of the camera body 18 from the print holding panel **16*a*** for different sized prints.

The distance between the two slides 7 and 13 is not affected by the rotation of the shaft 3. This distance can only be changed by the rotation of the elongated rectangular shaft 4. The rotation of said shaft 4 is transmitted through the pulley 8 and timing belt 9 to the pulley 10 which is fixed to the screw shaft 11. The pulley 10 causes the focusing shaft 11 to rotate which then moves the internally threaded bushing 12 back and forward to vary the distance between the said slides 7 and 13 and thereby adjust the focus of the camera independently of the positioning adjustment of said camera.

In order to prevent backlash and maintain positive positioning of the two said slides 7 and 13 by the respective actuating mechanisms thereof, a constant tension type spring 19, commonly referred to as a "negator" spring resiliently connects the main camera body slide 7 and one of the said supporting frame members 5. A similar constant tension spring 20 resiliently connects the lens mounting slide 13 with the main camera body slide 7. The internally threaded bushings 6 and 12 and the pulley 8 have spring friction connections with their respective shafts 3, 11 and 4 for maintaining positive anti-backlash driving connections with said respective shafts to produce and maintain positive positioning of the respective slides 7 and 13.

Counting devices 14 and 15 are mounted on the front portion of a light source housing 16 and are respectively connected by drive means such as the belt and pulley drives **14*a* and 15*a* to the shafts 3 and 4 to respectively count the increments of revolution thereof and thereby permit the distance of the camera from the print mounting panel 16*a* and the focus of said camera to be adjusted in accordance with predetermined number settings on the counters 14 and 15. The panel 16*a* is hinged along its bottom edge to the housing 16, and has a spring loaded print-clamping frame 23 pivotally connected thereto along its lower edge to positively position by use of a print mask 24 the photographic print 25 to be copied in optically centered position with respect to said camera. Said panel 16*a* pivots down away from the front of housing 16 for easy loading and unloading of a print 25 and pivots towards said housing 16 and may be held in closed position against the front face of said housing 16 as by hinge springs (not shown). The shafts 3 and 4 are rotated until the proper slide positions are indicated on the counters 14 and 15 to photograph the particular size print 25 held behind said panel 16*a*. The print is illuminated by the four light elements 22 respectively mounted in the four corners of the back of said housing 16. The camera is then actuated to copy said print 25**.

The counters 14 and 15 are indexed for each size print to be made from a minimum size of approximately 2½ × 3½ inches up to a maximum print size of approximately 8 × 10 inches. Since the distance adjustment is independent from the focus adjustment and adjusting one will not effect or change the other, it is possible for the operator to quickly and easily adjust for different size prints to be copied by merely looking at a prepared chart which will provide the respective counter settings for both the distance and focus for each size print.

It of course will be understood that various changes may be made in the form, details, arrangement and proportions of the parts without departing from the scope of this invention as set forth in the appended claims.

What is claimed is:

1. A camera mounting device for copying photographic prints comprising a rigid frame structure, a print holding panel mounted at one end of said frame structure to provide an operating station and adapted to hold a photographic print to be copied, means for supplying light to the print being held by said panel when such print is being photographed, a pair of parallel elongated main drive shafts extending substantially the full length of said frame structure and journaled for rotation thereon with one end of each shaft disposed at said operating station, control means connected to said shafts at said operating station for producing rotation of said drive shafts in both directions, a central guide track mounted on said frame structure between said shafts and disposed substantially normal to said print holding panel when the same is in operative position, a main body mounting slide and a lens mounting slide mounted on said track, a screw threaded focusing shaft connecting the two slides whereby rotation of said focusing shaft will vary the spacing between said two slides, the lens-mounting slide being adapted for connection with the lens element of a camera and the main body mounting slide being adapted for connection with the main body element of a camera with an adjustable camera bellows connecting the lens and body elements of the camera, one of said main drive shafts having externally screw threads formed thereon, an internally threaded bushing mated with said screw threads of the main drive shaft and connected to the main body slide to move both of said slides on said track to adjust the distance of the main camera body from the print holding panel, a driving pulley slidably mounted on the other main shaft but having a rotatable driving connection therewith, means rigidly connecting said pulley to said main camera mounting slide for back and forth sliding movement therewith, a belt and pulley driving connection between said driving pulley and said screw threaded focusing shaft to rotate said focusing shaft only when said second main shaft is rotating, and frictional means for maintaining positive anti-backlash connection between the adjustment shafts and the members driven thereby to accurately adjust and maintain the position of the respective slides in response to predetermined increments of rotation of said two main shafts.

2. The structure set forth in claim 1 and said frictional means including an internally threaded bushing mated with said focusing shaft and resilient gripping means for maintaining close fitting substantially constant frictional resistence to movement of said two bushings on their respective screw shafts to produce and maintain the desired adjusted position of said bushings and slides by rotation of said screw shafts.

3. The structure set forth in claim 2 and constant tension anti-backlash spring means respectively connecting said two slides together and connecting said main body slide to said frame structure.

4. The structure set forth in claim 1 and rotation counter means connected with said main drive shafts to respectively indicate the positions of said slides to permit a positioning indexing chart to be provided by each sized print to be copied.

* * * * *